Sept. 10, 1957 — D. W. ELZEA — 2,805,885
WHEELBARROW ATTACHMENT
Filed March 25, 1954 — 2 Sheets-Sheet 1
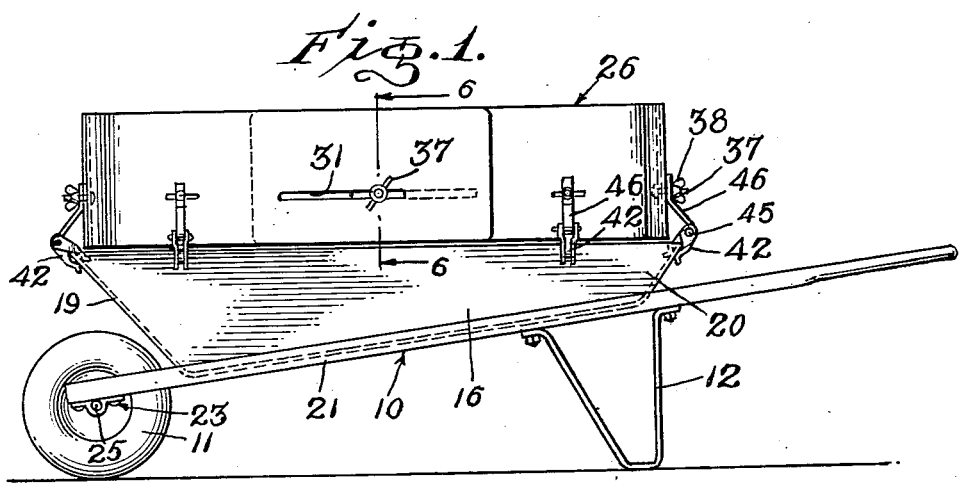
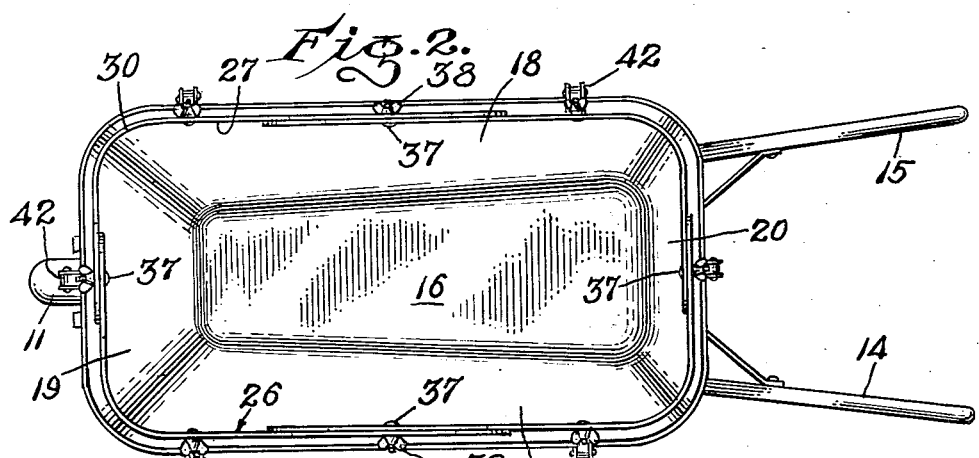
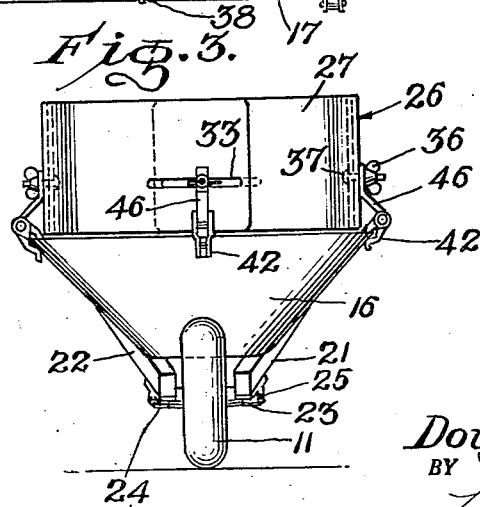
INVENTOR.
Douglas W. Elzea,
BY
L. S. Saulsbury
HIS ATTORNEY.

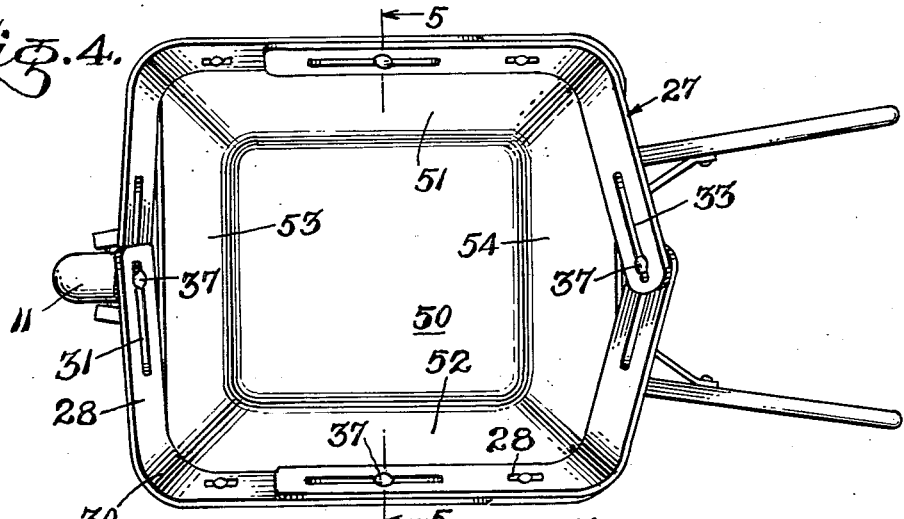
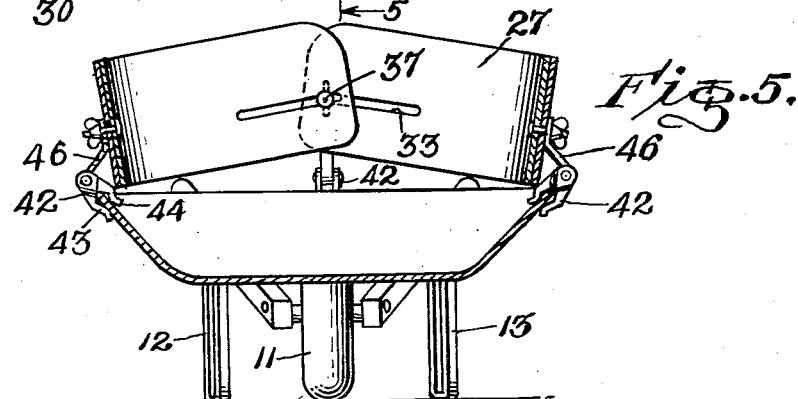
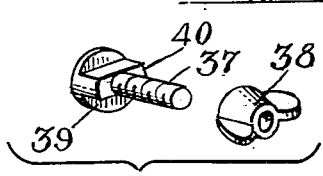
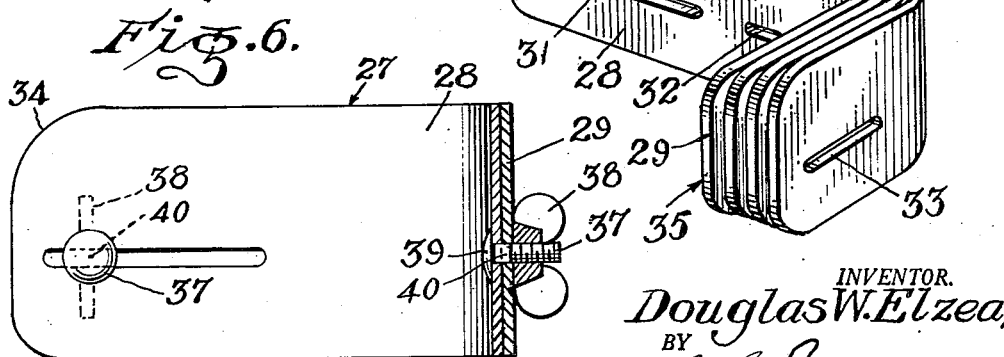

United States Patent Office 2,805,885
Patented Sept. 10, 1957

2,805,885

WHEELBARROW ATTACHMENT

Douglas W. Elzea, Port Washington, N. Y.

Application March 25, 1954, Serial No. 418,698

2 Claims. (Cl. 296—36)

This invention relates to a wheelbarrow attachment.

It is an object of the present invention to provide a wheelbarrow attachment adapted to increase the capacity of the wheelbarrow for the purpose of conveying light weight materials, such as leaves, straw, lawn rakings and the like.

It is another object of the invention to provide a wheelbarrow attachment which may be quickly attached to the upper edge of the wheelbarrow and which is formed of parts that may be nested when the attachment is disassembled from the wheelbarrow so as to consume little space when not in use on the wheelbarrow.

It is another object of the invention to provide a wheelbarrow attachment formed of four parts adapted to overlie one another on the four sides of the wheelbarrow and which are adjustable to different widths and lengths of the wheelbarrow and which are adjustable to be attached to any make of steel body wheelbarrow having a top horizontal edge.

Other objects of the invention are to provide a wheelbarrow attachment formed of collapsible and adjustable parts and having the above objects in mind, which is of simple construction, inexpensive to manufacture, has a minimum number of parts, easy to assemble, light in weight, durable, of pleasing appearance, convenient to use, efficient and effective in use.

For other objects and for a better understanding of the invention, reference may be had to the following detailed description taken in connection with the accompanying drawing, in which:

Figure 1 is an elevational view of a wheelbarrow having the wheelbarrow attachment of the present invention connected thereto;

Fig. 2 is a top plan view of the attachment and of the wheelbarrow;

Fig. 3 is an end elevational view of the attachment and of the wheelbarrow;

Fig. 4 is a top plan view of a wheelbarrow of different shape and wherein the attachment is expanded in such a manner as to conform with the inclined walls of the sides and ends of the wheelbarrow and with the sides of the attachment being inclined to give still further space to receive the lightweight material;

Fig. 5 is a vertical sectional view of the wheelbarrow and attachment as viewed on line 5—5 of Fig. 4;

Fig. 6 is a perspective view of a bolt adapted to extend through two of the parts and into the elongated slots thereof to rigidly hold the parts together;

Fig. 7 is an enlarged sectional view of two of the parts connected together and as viewed generally on line 5—5 of Fig. 4 for one side of the attachment and illustrating the manner in which the bolt is extended through the elongated slots to hold the parts against turning movement relative thereto;

Fig. 8 is a perspective view of a cluster of parts nested together when detached from the wheelbarrow and not in use, the same being nested to consume little storage space.

Referring now to the figures, 10 generally represents a wheelbarrow having single wheel 11, legs 12 and 13, handles 14 and 15 and an open metal top body 16 having upwardly and outwardly inclined opposing sides 17 and 18 and upwardly and outwardly inclined opposing ends 19 and 20. The body 16 rests on side frame pieces 21 and 22 that run in a converging manner toward the front wheel 11 and also from which the respective handles 14 and 15 are respectively extended. On the forward end of the frame pieces 21 and 22 are respectively bearings 23 and 24 in which wheel shaft 25 is journalled.

To the sides and ends of the metal body 16, the attachment embodying the features of the present invention may be attached. This attachment is indicated generally at 26. The attachment comprises four parts 27 of similar shape and design, made of flat metal stock, such as aluminum or of plastic or any other suitable material which may be fashioned into the desired shape and would be durable.

Each of these parts 27 has a long side 28 and a short side 29. The part 27 is bent to provide a round corner 30 and the sides extend as legs therefrom and at an angle from each other. The angle is ninety degrees.

In the long side or leg 28 is a long elongated slot 31 and a small slot 32 nearer to the corner 30 and in the short side 29 is an elongated slot 33. The ends of the sides are preferably rounded at their outer, or free, ends as indicated respectively at 34 and 35 in order to protect the user of the attachment from being injured by square corners.

These parts 27 can ordinarily be stored by assembling them in a nested manner, as shown in Fig. 8, but when put to use, they are arranged on the top edge of the wheelbarrow as shown with their sides arranged in overlapping manner. The short sides 29 will serve to close off the ends of the wheelbarrow and the long sides 28 will serve to close off the sides of the wheelbarrow.

With the parts assembled upon a wheelbarrow, such as shown in Figs. 1, 2 and 3, of rectangular shape, with the sides being longer than the ends, the sides 28 will be substantially extended and will be connected with one another by bolt 37 and a thumb nut 38. The bolt 37 has a round head 39 with a rectangular shaped projection 40 on the inner side thereof. This projection has a thickness slightly less than the width of the elongated slots and will extend through the slots so that upon the thumb nut being tightened, the projection 40 will rigidly and positively lock the sides 28 of the respective parts 27 against angular displacement with respect to each other and will provide a substantially rigid side of the attachment.

The sides 29 of the part 27 are similarly joined together on the rectangular shaped body, shown in Figs. 1, 2 and 3, by the same bolt 37 with its projection 40 extending through the elongated slots 33 and serving to hold the parts in a rigid manner at the ends of the attachment and of the wheelbarrow body.

With the parts of the attachment so assembled, the attachment may then be fixed to the sides and ends of the wheelbarrow body. For this purpose, spring clips 42 are provided. These spring clips 42 have jaw parts 43 and 44 urged normally toward one another by a spring and which are relieved along their inner faces to accommodate the rolled top edges of the wheelbarrow body. This spring clip 42 is connected by a pin 45 to a supporting strap 46. This supporting strap or bracket 46 is attached to the ends of the attachment by the end bolts 37 and the respective thumb nuts 38 thereof.

To support the attachment at the sides, spring clips 42 are respectively secured by their brackets 46 by bolts extending through the slots 32 of the long sides 28 of the parts 27. There would thus be two such spring clips extending along the sides of the attachment and connected to the respective sides of the metal body. The spring clip could also be attached to the bolt 37 that connects the long sides of the parts together to provide a third clip or to make unnecessary the need for the two clips on the sides. If the load is to be heavy and large, a greater number of clips will be used.

As shown in Figs. 4 and 5, the parts 27 may be assembled in a slightly different manner so that the sides of the parts at the ends will be angled with respect to one another in order that the sides of the attachment can be inclined outwardly to accommodate more material. The wheelbarrow, shown in Figs. 4 and 5, has a square bottom 50 with sides 51 and 52 and ends 53 and 54. The parts 27 are similarly constructed and are arranged over the edge of the wheelbarrow body 50 and along the sides and ends thereof in a similar manner except that the bolts 37 in connecting the sides of the parts together at the ends of the wheelbarrow will not have the projection 40 extending through the slots 33 so as to lock the parts. These slots 33 of the parts 27 will be angled in such a manner that the projection 40 may not be accommodated. The bolts, however, may still be used and when the thumb nuts 38 are tightened upon the bolts, the sides of the parts 27 will be frictionally held in tight and angled relationship with respect to each other. The sides of the parts running along the sides 51 and 52 of the wheelbarrow body will be inclined upwardly and outwardly, as more clearly shown in Fig. 5, and the ends of the sides 29 of the parts 27 will be elevated at their point of connection with one another. Bolts 37 will be extended through the sides 28 of the parts 27 which overlap one another at the sides of the wheelbarrow to hold these sides of the parts 27 positively locked with one another. A bracket 46 will be attached to each of the bolts 37 that connects the parts together and a spring clip 42 will depend therefrom for engagement with the sides and ends of the wheelbarrow body. In this manner the attachment is connected to the wheelbarrow body. It will be seen that inasmuch as the spring clips are pivotally connected to the brackets 46 that the spring clips can be adjusted to any inclination so as to properly and effectively engage the side edges of the side and ends of the metal wheelbarrow body.

It will be apparent that there has been provided an attachment which serves as an extension for the metal dished body that can be quickly attached to the edges of the body and adapted to hold and support a large load of light weight material, and that with this attachment one may carry in the wheelbarrow more than twice as much as otherwise. It will be further apparent that the parts of the attachment are collapsible and can be nested together so as to consume little storage space and that the parts are of common shape and size so that the manufacture of the attachment is made simple. It will be also apparent that the spring clips are adjustable to different angles in order to permit the attachment to be accommodated to different wheelbarrows having different inclination of the sides and ends of the metal body.

While various changes may be made in the detail construction, it shall be understood that such changes shall be within the spirit and scope of the present invention as defined by the appended claims.

What is claimed is:

1. A wheelbarrow attachment comprising a plurality of interchangable, similarly-shaped corner parts adapted to be horizontally-assembled to one another about the upper edge of the wheelbarrow body, each of said corner parts having a corner portion and side and end leg portions extending therefrom at an angle with respect to one another, said side and end leg portions respectively having horizontally-extending elongated slots therein, said side and end leg portions of the parts overlie one another so that the slots register with each other, fastening bolts adapted to extend through the registered slots, vertically-extending brackets respectively carried on the fastening bolts, fastening nuts on the bolts for clamping the leg portions together and fixing the brackets thereto, and spring clips respectively pivotally connected to the lower ends of said brackets whereby the clips may be attached to the upper edge of the wheelbarrow body.

2. A wheelbarrow attachment as defined in claim 1 and each of said fastening bolts having a head and a rectangular-shaped projection extending therefrom, said projection having a thickness substantially equal to the width of the elongated slots, the projections of these bolts entering the registered slots and serving, when the nuts are tightened, to lock the parts against angular displacement relative to each other, but permitting, when used outside of the slots and the nuts tightened, the parts to be held with their leg portions angled relative to one another and elevated to increase the effective height of the parts above the upper edge of the wheelbarrow body.

References Cited in the file of this patent

UNITED STATES PATENTS

| | | |
|---|---|---|
| 733,889 | Wolfskill | July 14, 1903 |
| 1,297,526 | Woods | Mar. 18, 1919 |
| 1,769,271 | Parsons | July 1, 1930 |
| 2,020,991 | Brody | Nov. 12, 1935 |
| 2,676,054 | Pasin | Apr. 20, 1954 |
| 2,683,610 | Brown | July 12, 1954 |